Patented Aug. 10, 1954

2,686,173

UNITED STATES PATENT OFFICE 2,686,173

UNSATURATED DERIVATIVES OF ALKYLOL-AMINES AND POLYMERS

John C. Sauer, Wilmington, Del., assignor to E. I. du Pont de Nemours and Company, Wilmington, Del., a corporation of Delaware No Drawing. Application December 3, 1952, Serial No. 323,937

7 Claims. (Cl. 260—85.5)

This invention relates to new unsaturated organic compounds and their polymers. More particularly, it relates to new unsaturated derivatives of alkylolamines and to their polymerization products.

This application is a continuation-in-part of applicant's copending application Serial No. 269,339, filed January 31, 1952.

An object of the present invention is to provide a new class of ethers of N-monocarbacyl alkylolamines which are stable under ordinary conditions but which can be converted to polymers and copolymers of useful properties. Other objects will be apparent from the description of the invention given hereinafter.

The above objects are accomplished according to the present invention by providing a class of unsaturated ethers of N-monocarbacyl alkylolamines having the general formula $$H_2C=CH-O-R_1-NH-\underset{\underset{O}{\|}}{C}-R_2$$

where $R_1$ is a divalent polymethylene radical of 2 to 6 carbon atoms, inclusive, and $R_2$ is hydrogen or an alkyl radical of 1 to 4 carbon atoms, inclusive. The polymers of these compounds also form a part of the present invention.

The monomers of this invention can be prepared, for example, by reacting an omega-vinyloxyalkyl amine with an acylating agent to give the N-acyl derivative The monomeric vinyl ethers of N-acyl alkylolamines defined above are high boiling liquids which are stable under ordinary conditions but which can be converted to polymers and copolymers under the influence of heat and/or of suitable polymerization initiators. These polymers, which contain N-acylaminoalkyloxy side chains, are useful in the various applications for which polymeric materials are normally suitable, such as plastics, coatings, films, and the like. In addition, they have a special usefulness in the fact that the acyl groups can be hydrolyzed, thus leading to polymers containing free amino groups in side chains. Such polymers are of increasing technical importance. The copolymers of (N-vinyloxyalkyl) formamides with acrylonitrile are of special interest, in view of their ability to absorb acid dyes.

The invention is illustrated in greater detail in the following examples, in which all proportions are by weight, unless otherwise stated.

Example I

This example illustrates the preparation of N-(beta-vinyloxyethyl) formamide,

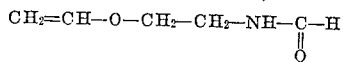

Ninety parts of beta-vinyloxyethylamine (B. P. 117–118° C., prepared by condensing acetylene at 200 lbs./sq. in. pressure and 110° C. with monoethanolamine in the presence of potassium hydroxide catalyst) was mixed with 63 parts of methyl formate at room temperature. The heat of reaction was noticeable almost immediately and the internal temperature reached a maximum of 70° C. within 15 minutes. Some slight refluxing of the methyl formate took place. Distillation of the reaction mixture following the spontaneous reaction gave 96 parts of N-(beta-vinyloxyethyl) formamide, B. P. 87° C. at 0.9 mm. pressure, $n_D^{25}$ 1.4689.

Analysis.—Calcd. for $C_5H_9O_2N$: C, 52.17; H, 7.82; N, 12.17. Found: C, 52.46; H, 8.04; N, 11.56.

The structure of the compound was confirmed by infrared spectrographic analysis, which indicated the presence of the vinyloxy and amido groups.

Example II

A mixture of 11.5 parts of N-(beta-vinyloxyethyl)-formamide, 31.2 parts of freshly distilled styrene and 0.36 part of alpha,alpha'-azodiisobutyronitrile catalyst was heated at 60° C. for 1½ hours and allowed to stand at room temperature overnight, after which another 0.3 part of alpha,alpha'-azodiisobutyronitrile was added and the mixture was heated at 80° C. for 4 hours. The resulting semi-solid copolymerization product was dissolved in xylene and the solution was poured into methanol. The precipitated copolymer was filtered and dried at 40° C. for 24 hours. There was thus obtained 28.5 parts of a solid styrene/N-(beta-vinyloxyethyl)-formamide copolymer containing 0.53% nitrogen by analysis. This corresponds to 4.35% of polymerized N-(beta-vinyloxyethyl)-formamide by weight of the copolymer.

Example III

A mixture of 15 parts of N-(beta-vinyloxyethyl)-formamide, 35 parts of freshly distilled vinyl acetate, 50 parts of tertiary butyl alcohol and 0.8 part of alpha,alpha'-azodiisobutyronitrile was heated at 100° C. in an atmosphere of deoxygenated nitrogen for 4 hours. The resulting viscous solution was poured into diethyl ether with stirring, the coagulum was dissolved in acetone, and the resulting solution again poured into ether. The precipitated polymer was dried at room temperature and under 1 mm. pressure for 20 hours. There was obtained 43 parts of a solid N-(beta-vinyloxyethyl)-formamide/vinyl acetate copolymer containing 25.4% by weight of polymerized N-(beta-vinyloxyethyl) formamide, as calculated from the nitrogen content of 3.09%.

The above copolymer was converted to a copolymer containing vinyl alcohol and beta-vinyloxyethylamine units as follows: a mixture of 6 parts of the copolymer and 50 parts of methanol containing a trace of sodium was refluxed for 6 hours, during which period the methyl acetate formed in the methanolysis was slowly drawn off through a fractionating column. The resulting polymer solution was poured into diethyl ether and the precipitated polymer was dried at room temperature and under 1 mm. pressure for 16 hours. This polymer contained 1.38% of primary amino nitrogen, indicating the presence of 8.5% of polymerized beta-vinyloxyethylamine. This polymeric primary amine was soluble in 10% aqueous acetic acid. Addition of aqueous formaldehyde followed by evaporation gave a film which was no longer soluble in dilute acid.

Example IV

N-(beta-vinyloxyethyl)formamide and acrylonitrile were copolymerized as follows: A solution of 0.342 part of potassium dihydrogen phosphate in 190 parts of distilled water was adjusted to a pH of 7 with sodium hydroxide solution, and placed in a pressure vessel. To this solution was added 13 parts of acrylonitrile, 0.685 part of N-(beta-vinyloxyethyl)-formamide, and 0.1888 part of thiourea. (The use of thiourea and related compounds in polymerization systems is described in U. S. Patent 2,552,327.) The vessel was then flushed with nitrogen, 5.68 parts of 3% aqueous hydrogen peroxide was added to its content, and the vessel was sealed. After standing for 3 hours at room temperature, the polymer which had formed and precipitated from the aqueous polymerization system was filtered, washed thoroughly with water and dried at 65° C. under reduced pressure. There was obtained 9 parts of a white copolymer of N-(beta-vinyloxyethyl)formamide and acrylonitrile. Infrared spectroscopy showed that the polymer contained ether groups and formamide groups, thus establishing that it contained polymerized N-(beta-vinyloxyethyl)formamide units. It had an intrinsic viscosity of 1.59, as measured on a 0.2% solution in dimethylformamide at 25° C. Films cast from 15% solutions in dimethylformamide were clear and colorless and were not discolored on heating at 165° C. for 20 minutes.

Example V

To a mixture of 10 parts of N-(beta-vinyloxyethyl)-formamide and 10 parts of vinylisobutyl ether cooled to —80° C. in a nitrogen atmosphere was added, with stirring, one drop of 100% sulfuric acid. The mixture darkened slightly and stirring was continued while gradually warming the mixture to room temperature. At room temperature, the mixture was a very viscous tan liquid, which was washed with water, then dried at 1 mm. pressure and room temperature for two days. There was thus obtained 9.5 parts of a viscous copolymer of N-(beta-vinyloxyethyl)-formamide and vinyl isobutyl ether. This copolymer contained 5.16% nitrogen, corresponding to 42.3% by weight of polymerized N-(beta-vinyloxyethyl)-formamide.

Example VI

A solution of 20 parts of N-(beta-vinyloxyethyl)-formamide, 80 parts of methyl metacrylate and 1 part of benzoyl peroxide in 80 parts of tertiary butanol was heated at reflux on a steam bath for 7 hours and subsequently allowed to stand at 25° C. for 2 days. The polymer was isolated by dissolving this mixture in benzene (175 parts) at reflux and diluting with methanol. The filtered precipitate was redissolved in hot benzene and reprecipitated by methanol dilution. After being dried for 24 hours at 5 mm. pressure, there was obtained 63 parts of a copolymer of N-(beta-vinyloxyethyl)-formamide and methyl metacrylate. Analysis showed that it contained 7% of polymerized N-(beta-vinyloxyethyl)-formamide.

Example VII

A solution of 9 parts of N-(beta-vinyloxyethyl)-formamide and 0.1 part of ditertiary butyl peroxide in 90 parts of thiophene-free benzene contained in a silver-lined pressure vessel was pressured with ethylene and heated with agitation at 130–135° C./900–1000 atm. pressure for 4 hours. More ethylene was added as required to maintain the pressure. The reaction product was dissolved in 220 parts of xylene at reflux, precipitated by cooling and filtered. This step was repeated a second time. After drying for 65 hours at 5 mm. pressure, there was obtained 73 parts of a copolymer of ethylene and N-(beta-vinyloxyethyl)-formamide containing, by nitrogen analysis, 4% of polymerized N-(beta-vinyloxyethyl)-formamide.

Example VIII

A mixture of 180 parts of lauryl methacrylate, 14.5 parts of N-(beta-vinyloxyethyl)-formamide and 1 part of alpha,alpha'-azodiisobutyronitrile was heated for four hours at 65° C. in the manner of Example III above. There was thus obtained a lauryl methacrylate/N-(beta-vinyloxyethyl)-formamide copolymer as an oil-soluble, clear, tacky, rubber-like resin.

To a solution of 90 parts of the above lauryl methacrylate/N-(beta-vinyloxyethyl)form-amide copolymer in about 400 parts of benzene was added 110 parts of 18% aqueous hydrochloric acid and the resulting mixture heated at a gentle reflux for one hour with stirring. The resulting creamy emulsion was treated with an excess of 20% aqueous sodium hydroxide solution and the organic layer thereby obtained removed, washed well with water and any retained benzene-water removed by evaporation at steam bath temperatures under atmospheric pressure and finally under reduced pressure. There was thus obtained an oil-soluble, highly viscous, tacky copolymer which upon analysis was found to contain 0.25% primary amino nitrogen, indicating the presence of 1.4% combined beta-vinyloxyethyl amine groups.

Example IX

This example illustrates the preparation of N-(beta-vinyloxyethyl) butyramide,

A mixture of 36.8 parts of beta-vinyloxyethyl-amine and 50.2 parts of ethyl n-butyrate was heated in a still, slowly distilling off ethanol over a period of 3.5 hours. The residue in the still was then distilled. After the unreacted starting materials had been removed, there was obtained 3.5 parts of N-(beta-vinyloxyethyl) butyramide as a colorless liquid boiling at 167–169° C. at 50 mm. pressure.

*Analysis.*—Calcd. for $C_8H_{15}O_2N$: C, 61.14; H, 9.55; N, 8.91. Found: C, 60.79; H, 9.92; N, 8.57.

Example X

This example illustrates the preparation of N-(3-vinyloxypropyl) formamide,

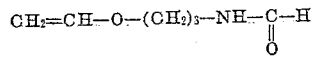

To a solution of 8 parts of sodium in 250 parts of 3-aminopropanol was added 220 parts of dry benzene. The mixture was heated under acetylene pressure for 8 hours at 140° C. and 200 lb./sq. in. total pressure. The resulting reaction product was filtered and the filtrate was fractionally distilled at atmospheric pressure to give a 64% yield of 3-vinyloxypropylamine, a colorless liquid boiling at 134–139° C., $n_D^{27.5}$ 1.4400.

To the 3-vinyloxypropylamine so obtained was added dropwise with stirring 120 parts of methyl formate over a period of 45 minutes at room temperature, then the mixture was heated under reflux on a steam bath for one hour. After standing overnight at room temperature the mixture was fractionated and the fraction boiling at 113° C. at 2 mm. pressure was redistilled over activated charcoal to give an 85% yield of N-(3-vinyloxypropyl) formamide, a colorless liquid boiling at 113° C. at 2 mm. pressure, $n_D^{30}$ 1.4645.

*Example XI*

To a solution of 95 parts of acrylonitrile and 5 parts of N-(3-vinyloxypropyl)formamide in 1500 parts of deaerated water at 40° C. was added a solution of 3.8 parts of potassium persulfate and 1.9 parts of sodium bisulfite in 50 parts of distilled water. The polymerization mixture was maintained at 40° C. for 1.5 hours under nitrogen. The polymer which had separated was removed by filtration, washed with water, then with acetone and dried at 60° C. under reduced pressure. There was obtained 70 parts of an acrylonitrile/N-(3-vinyloxypropyl)formamide copolymer having an intrinsic viscosity in dimethylformamide of 2.2. Infrared analysis indicated that the copolymer contained about 5% of polymerized N-(3-vinyloxypropyl)formamide by weight. Fibers obtained by spinning a 22% solution of this polymer in dimethylformamide had excellent thermal stability, dyed well with acid dyes and exhibited excellent scour fastness.

It will be understood that the above examples are merely illustrative and that the present invention broadly comprises, as a new class of compounds, the monomeric vinyl ethers of N-monocarbacyl alkylolamines in which the carbacyl group is saturated, contains only carbon and hydrogen in addition to the carbonyl oxygen, and has from one to five carbon atoms, inclusive, and in which alkylolamines the amino group is separated from the hydroxyl group by a chain of two to six methylene groups, inclusive, and polymers thereof.

In addition to the compounds whose preparation was illustrated in the examples, other prominent specific compounds of the herein considered class include: N-(omega-vinyloxyhexyl) formamide, N-(delta-vinyloxybutyl) acetamide, and N-(beta-vinyloxyethyl) propionamide.

The preferred compounds, because of greater ease of preparation and of availability of starting materials, are the N-(beta-vinyloxyethyl) amides of alkanoic acids of one to four carbon atoms, inclusive. Still more preferred, because of the greater ease of hydrolysis of the polymers to polyprimary amines, are the above compounds in which the amido group is the formamido group. The most useful specific compound is N-(beta-vinyloxyethyl) formamide.

The invention also includes as new products the polymers of the above-described unsaturated monomers and their copolymers with other polymerizable unsaturated monomers. Copolymers can be prepared with any other polymerizable ethylenically unsaturated compounds, and particularly with vinylidene compounds, i. e., compounds having a terminal methylene, $H_2C=$, group attached by a double bond to the adjacent carbon. Examples of such compounds are the vinylidene halides such as vinyl fluoride, vinyl chloride, vinyl bromide, vinyl iodide, 1,1-difluoroethylene, 1,1-dichloroethylene; vinylidene hydrocarbons such as isobutylene, 1,3-butadiene, styrene; halovinylidene hydrocarbons such as 2-fluoro-1,3-butadiene, 2-chloro-1,3-butadiene, 2,3-dichloro-1,3-butadiene; acrylic, haloacrylic and alkacrylic acids, esters, nitriles and amides such as acrylic acid, methacrylic acid, alpha-chloroacrylic acid, ethyl acrylate, methyl methacrylate, butyl methacrylate, methoxymethyl methacrylate, chloroethyl methacrylate, beta-diethylaminoethyl methacrylate, acrylonitrile, methacrylonitrile, acrylamide, methacrylamide; vinyl carboxylates such as vinyl formate, vinyl acetate, vinyl chloroacetate, vinyl butyrate, vinyl laurate; unsaturated aldehydes and ketones such as acrolein, methacrolein, methyl vinyl ketone; N-vinyl imides such as N-vinylphthalimide, N-vinylsuccinimide; unsaturated ethers such as vinyl ethyl ether, 2-phenoxy-1,3-butadiene; other vinyl monomers such as vinylpyridine, N-vinylcaprolactam; and other polymerizable or copolymerizable unsaturates such as tetrafluoroethylene, diethyl fumarate, dimethyl maleate and the like. Two or more vinylidene monomers may be copolymerized with the unsaturated ethers and esters of this invention.

The most generally useful copolymers are those of the N-(beta-vinyloxyethyl) carbonamides, particularly N-(beta-vinyloxyethyl) formamide, with vinyl esters, particularly vinyl esters of an alkanoic monocarboxylic acid of one to four carbon atoms, or with nitriles of alpha-methylene alkanoic monocarboxylic acids of three to four carbon atoms (acrylic and methacrylic acid nitriles), or with aliphatically unsaturated hydrocarbons having a terminal methylene group, particularly a monounsaturated hydrocarbon of two to eight carbon atoms, inclusive. Copolymers having distinctive properties (e. g., giving acid-soluble amino polymers on hydrolysis) can be obtained with as little as 1% by weight of polymerized vinyl ether of N-monocarbacyl alkylolamine based on the total weight of polymerized material, although preferably the copolymers contain at least 3% by weight of the polymerized vinyl ether of N-monocarbacyl alkylolamine.

N-(beta-vinyloxyalkyl) formamides are distinctive in that they will form acid-dyeable copolymers with monomers whose homopolymers cannot normally be dyed with acid dyes. For example, copolymers of acrylonitrile and N-(beta-vinyloxyethyl) formamide or N-(3-vinyloxypropyl) formamide are unique in that they are dyeable with acid wool dyes even though they are not basic. This is due to the fact that the formyl group is of such nature as to hydrolyze slowly under the acid conditions of the dye bath. Thus, basic sites are developed continually during the dyeing process and covered immediately with acid dye molecules. Quantitative experiments have shown that the rate of dyeing parallels the rate of hydrolysis of formyl groups.

Basic copolymers of acrylonitrile (such as the vinylpyridine copolymers) discolor badly when heated. Usually the discoloration becomes progressively worse as the basicity of the base increases. Unlike the basic copolymers, the copolymers of acrylonitrile and N-(beta-vinyloxyethyl) formamide do not discolor on heating any more than does unmodified polyacrylonitrile; yet once in the dye bath they appear to be more strongly basic than vinylpyridine copolymers, as measured by their ability to take up acid dyes. Particularly useful are the copolymers containing from 3% to 10% by weight of polymerized N-(beta-vinyloxyalkyl)formamide, especially N-(beta-vinyloxyethyl)formamide.

Examples XII to XIV below show how fibers dry-spun from an acrylonitrile/N-(beta-vinyloxyethyl)formamide (95/5) copolymer dissolved in dimethylformamide and drawn four times their length in the usual fashion can be dyed with acid dyes. A general procedure useful for nearly all acid dyes is to dye in a 50:1 dye bath for 0.3 to 3 hours with 5% dye and 5% sulfuric acid, based on the fiber weight. After dyeing the fibers are scoured in a 0.5% aqueous solution of a detergent such as sodium dodecyl sulfate for 0.3 to 2 hours.

*Examples XII*

An aqueous solution containing 0.002 g./ml. of the acid dye having Color Index No. 179 was prepared, and 5 ml. of this solution were diluted with 3 ml. of water and 2 ml. of 0.1 N sulfuric acid. Two-tenths gram of fiber from an acrylonitrile/N-(beta-vinyloxyethyl)formamide (95/5) copolymer was boiled in this dye bath for 2 hours, rinsed with water, scoured ½ hour in 0.5% technical sodium dodecyl sulfate, rinsed and dried. The fiber absorbed 77% of the dye in the dye bath. A polyacrylonitrile fiber treated in the same way did not absorb any of the dye.

*Example XIII*

An aqueous solution of 0.002 g./ml. of a blue anthraquinone dye whose recognized foreign prototype is Alizarin Supra Blue A, was prepared, and 5 ml. of this solution were diluted with 3 ml. of water and 2 ml. of 0.1 N sulfuric acid. Two-tenths gram of fiber from an acrylonitrile/N-(beta-vinyloxyethyl)formamide (95/5) copolymer was boiled for 2 hours in this dye bath, rinsed in water, scoured ½ hour in 0.5% technical sodium dodecyl sulfate, rinsed and dried. The fiber absorbed 95% of the dye from the dye bath. As in Example XII, a polyacrylonitrile fiber failed to absorb any of the dye.

The following example illustrates a pretreatment which makes the copolymer fiber dye as rapidly as wool.

*Example XIV*

One-tenth gram of fiber from an acrylonitrile/N-(beta-vinyloxyethyl)formamide (95/5) copolymer was heated at 97° C. for 2 hours in 1 N sulfuric acid, rinsed and then dyed in the dye bath (as in Example XIII) along with an equal weight of wool. Visual observation showed that dyeing was more rapid than in Example XIII and that the wool and the copolymer dyed at the same rate.

The polymers and copolymers of this invention vary in physical appearance from viscous oils to high melting solids, depending upon the nature of the monomers and the relative amounts of comonomers, in the case of copolymers, and upon the molecular weight of the final product. They are prepared by any suitable known polymerization method, e. g., by bulk, solution, dispersion or emulsion polymerization. Preferably, the polymerization is carried out with the help of free radical-producing initiators such as the inorganic and organic peroxides, e. g., hydrogen peroxide, benzoyl peroxide, tert.-butyl hydroperoxide, lauroyl peroxide, etc. or the azonitrile initiators of U. S. Patent 2,471,959. Excellent initiators for use in aqueous systems are the following recently proposed combinations: a water-soluble metal thiocyanate with hydrogen peroxide or an organic hydroperoxide (application Serial No. 138,525, filed by E. G. Howard on January 13, 1950); a salt of a hydrazobisalkanesulfonic acid, such as sodium hydroazobismethane sulfonate, with hydrogen peroxide and a cupric or ferric ion (U. S. Pat. 2,589,258); and particularly the combination of an alkali metal persulfate with an inorganic, oxidizable sulfoxy compound such as sodium bisulfite (U. S. Pat. 2,462,354). Polymerization can also be carried out with the help of acidic initiators such as sulfuric acid, ferric chloride, boron trifluoride and the like.

The monomers of this invention are useful per se, for example, as plasticizers for regenerated cellulose film, and they are also useful as intermediates for numerous other chemicals in view of the presence in the molecule of a reactive double bond capable of adding to many other molecules. The polymers and copolymers have the general usefulness of resinous materials in coating, impregnating or molding compositions. They give thermally stable shaped structures such as fibers and films and, as has been shown, they can be hydrolyzed to polyprimary amines, which are useful modifying agents for a number of synthetic polymers, and are also useful, for example, for improving the wet strength of papers and as ingredients in adhesives and water paints. The acrylonitrile/N-(beta-vinyloxyalkyl)formamide copolymers are of especially high technical interest because of their ability to accept acid dyes, the most useful and most important of these materials being the acrylonitrile/N-(beta-vinyloxyethyl)formamide copolymers.

As many apparently widely different embodiments of this invention may be made without departing from the spirit and scope thereof, it is to be understood that the invention is not limited to the specific embodiments thereof except as defined in the appended claims.

The invention claimed is:

1. A compound of the formula $$H_2C=CH-O-R_1-NH-\underset{\underset{O}{\|}}{C}-R_2$$

wherein $R_1$ is a divalent polymethylene radical of 2 to 6 carbon atoms, inclusive, and $R_2$ is from the group consisting of hydrogen and alkyl radicals of 1 to 4 carbon atoms, inclusive.

2. A polymer of the compound set forth in claim 1.

3. A copolymer of the compound set forth in claim 1 and a second polymerizable vinylidene compound.

4. An N-(beta-vinyloxyethyl)amide of an alkanoic acid of 1 to 4 carbon atoms, inclusive.

5. A copolymer of the compound set forth in claim 5 and acrylonitrile.

6. N-(beta-vinyloxyethyl)formamide.

7. A copolymer of N-(beta-vinyloxyethyl)-formamide and acrylonitrile.

References Cited in the file of this patent

UNITED STATES PATENTS

| Number | Name | Date |
|---|---|---|
| 2,430,949 | Porter et al. | Nov. 18, 1947 |